J. NIGHTINGALE & J. SACKETT.
SCREW STOPPER FOR BOTTLES AND OTHER RECEPTACLES.
APPLICATION FILED JAN. 9, 1911.

1,016,286.

Patented Feb. 6, 1912.

Witnesses.

Inventors
John Nightingale &
John Sackett.
Attorney.

UNITED STATES PATENT OFFICE.

JOHN NIGHTINGALE AND JOHN SACKETT, OF CHARLTON, ENGLAND.

SCREW-STOPPER FOR BOTTLES AND OTHER RECEPTACLES.

1,016,286.  Specification of Letters Patent.  Patented Feb. 6, 1912.

Application filed January 9, 1911. Serial No. 601,594.

*To all whom it may concern:*

Be it known that we, JOHN NIGHTINGALE and JOHN SACKETT, subjects of His Majesty the King of Great Britain, residing at Charlton, in the county of Kent, England, have invented a new and useful Improvement in Screw-Stoppers for Bottles and other Receptacles, of which the following is a specification.

This invention relates to screw-stoppers and has for its object to provide a stopper for bottles and the like wherein the detachable rubber ring or washer usually located between the head and screw-threaded shank of the stopper is dispensed with.

In accordance with our invention we provide a stopper of suitable rubber composition, capable of vulcanization, constructed in one piece but having the screw-threaded shank of vulcanized rubber composition vulcanized to a hard degree, while the head and neck of the stopper are of a softer and more elastic nature. The neck or collar of the stopper, which in the ordinary stopper is occupied by the rubber ring aforesaid, is in our stopper formed of a larger diameter than the rest of the shank and this enlarged neck or collar may be of cylindrical or slightly conical form, and its surface may be plain or ribbed and grooved as is found desirable.

Figure 1:
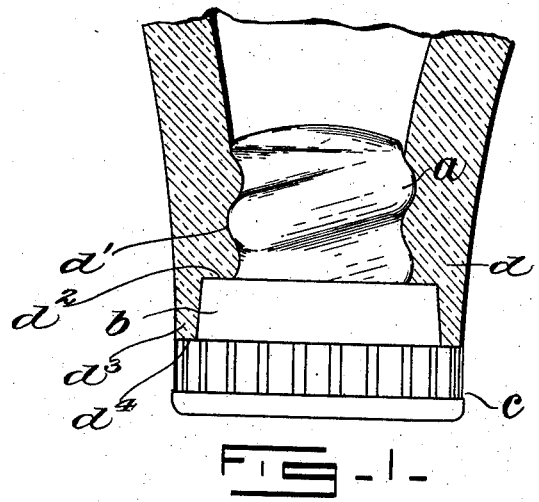
Figure 2:
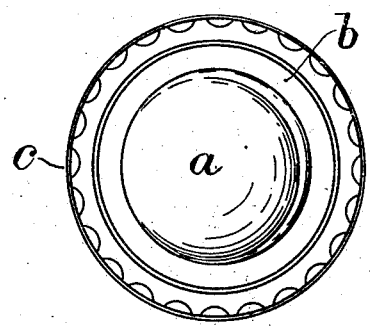

In the drawings Figure 1 is an outside elevational view of a stopper and Fig. 2 is a plan view.

Referring to these drawings, $a$ designates the screw threaded shank of the stopper which is in all cases vulcanized hard; $b$ is the neck or collar which is essentially in all cases of more elastic and yielding a nature than the shank $a$, and $c$ is the milled head which may be of the same degree of hardness as either the neck $b$ or the shank $a$ according to convenience. In actual practice we propose to make the screw-threaded shank hard and the neck $b$ and head $c$ of a softer nature, but we may make the shank $a$ and the head $c$ hard so long as the neck $b$ which serves to make the tight joint with the bottle is made sufficiently yielding. We prefer however to make the head $c$ of the stopper of a yielding nature at any rate on its underside so that it will fit down upon the top of the bottle.

One application of our invention is indicated in Fig. 1 wherein the neck $d$ of the bottle is provided with a threaded portion $d'$, to fit the threaded shank, a shouldered portion $d^2$, to fit the lower base of the neck $b$, a conical portion $d^3$ to fit the circumference of the neck $b$, and a top mouth portion $d^4$ to engage the lower shouldered portion of the head $c$. It will thus be seen that in accordance with our invention there may be closure points between yielding parts of the stopper at $d^2$, $d^3$ and $d^4$, thereby absolutely insuring a positive closure of the neck of the bottle. This is especially true when used with many kinds of liquid goods.

What we claim as our invention, and desire to secure by Letters Patent, is:—

1. A one piece rubber stopper for bottles comprising an integral body provided with a threaded shank of a relatively high degree of hardness, a conical neck having a diameter exceeding the greatest diameter of the shank thereby forming a shouldered bottle closing portion and a peripheral bottle-closing portion, the said neck being relatively soft as compared to the shank, and a head or top portion having a diameter exceeding the diameter of the shank to provide a shouldered portion for closing the top of the mouth of the bottle, the said shouldered portion of the head being of a relatively soft yielding nature, substantially as described.

2. A one piece stopper for bottles comprising an integral body provided with a threaded shank of a relatively high degree of hardness, a neck relatively soft as compared with the shank to form a closing portion, and a top or head portion having a relatively soft bottle closing portion, substantially as described.

3. A one piece rubber stopper for bottles comprising an integral body provided with a threaded shank of a relatively high degree of hardness, a neck relatively soft with respect to the shank and having angularly disposed bottle closing portions, and a top or head portion of a relatively high degree of hardness and having a soft yielding bottle closing portion, substantially as described.

4. A one-piece rubber stopper for bottles comprising an integral body provided with a threaded shank of a relatively high degree of hardness, a head of a relatively high degree of hardness and having a relatively soft bottle-closing portion, and a plurality of relatively soft bottle-closing portions angularly disposed with respect to the soft-closing portion of the head and with respect to each other and arranged in successive order from the threaded portion to the head whereby one supplements the other in effecting closure of the mouth of the bottle.

In testimony whereof we affix our signatures in presence of two witnesses.

JOHN NIGHTINGALE.
JOHN SACKETT.

Witnesses:
H. V. PUMFREY,
R. F. WILLIAMS.

Copies of this patent may be obtained for five cents each, by addressing the "Commissioner of Patents. Washington, D. C."